W. FOWLER.
BALL BEARING.
APPLICATION FILED AUG. 25, 1917.

1,270,400.

Patented June 25, 1918.

Witnesses:
E. Alder
M. Fraix

Inventor:
Walter Fowler
by C. Jewes
His Attorney.

UNITED STATES PATENT OFFICE.

WALTER FOWLER, OF DONCASTER, ENGLAND.

BALL-BEARING.

1,270,400.  Specification of Letters Patent.  Patented June 25, 1918.

Application filed August 25, 1917.  Serial No. 188,212.

*To all whom it may concern:*

Be it known that I, WALTER FOWLER, a subject of the King of England, residing at Doncaster, in the county of York, England, have invented Ball-Bearings, of which the following is a specification.

This invention relates to ball-bearings of the type wherein, for the purpose of enabling the installation of the anti-friction balls to be completed, one of the two parts constituting the ball-race is canted in relation to the other part. In some instances, the balls are arranged in grooves or races formed in the outer surface of the inner member of the bearing, while in others, they are arranged in grooves formed in the inner surface of the outer member.

My invention consists in an improved construction wherein a radial bearing of the latter type is combined with an axial or thrust bearing, and in order that the invention may be clearly understood, reference is made to the accompanying drawing, in which:—

Figure 1:
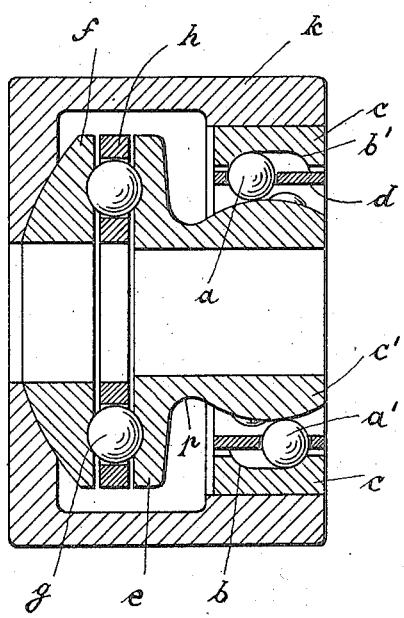

Figure 1 is a vertical section, and

Figure 2:
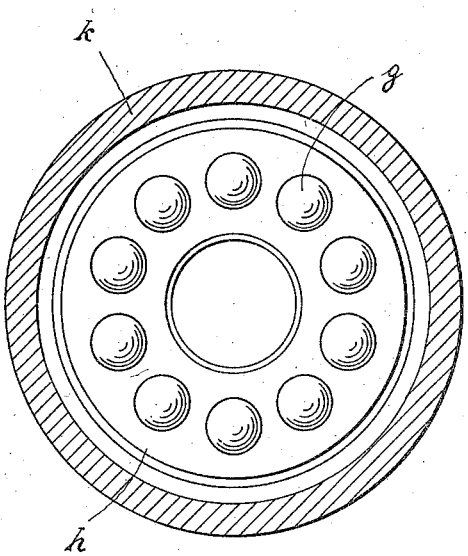

Fig. 2 a plan, partly in section, of a combined radial ball-bearing and axial ball-bearing constructed according to my improved method.

In carrying out my invention I make provision of a radial bearing which is furnished with two series of balls $a$ $a'$ arranged in parallel grooves $b$ $b'$ formed in the inner surface of the outer member $c$ of the bearing. The bearing surface of the inner member $c'$ is formed as a portion of a sphere and is capable of being canted laterally in relation to the bearing surface of the outer member $c$ and to such a degree as to admit of the balls $a$ $a'$ being successively inserted in or removed from the grooves $b$ $b'$. With the object of maintaining the balls pertaining to each series in position and at suitable intervals apart, they are arranged in a ring $d$ serving as a cage and spacer.

The axial bearing is constituted by forming the inner member $c'$ with a radially extending flange $e$. The face of this flange is grooved and forms one member of a ball-bearing; the other member consisting of a similarly grooved ring $f$. Between these two grooves is arranged a series of anti-friction balls $g$, the grooved parts $e$ and $f$ in conjunction with the series of anti-friction balls $g$ constituting an axial or thrust-bearing.

In the present design, the ring $f$ is shown mounted in a spherical seat in the casing $k$, but this is not essential as the ring $f$ may be cylindrically or conically mounted in the casing $k$, or may be integral therewith.

For the purpose of installing in position and facilitating the assembling of the anti-friction balls pertaining to the radial ball-bearing, I prefer to round off that portion of the member $c'$ adjacent to the spherical part and to the flange $e$ respectively, so that the curve $p$ corresponds with the radius of the balls $a$.

The inner series $a$ of these balls can thus, during the assembling of the latter and other parts, be made to rest in said curve and in the ring $d$ and subsequently brought into the position shown in the drawing. To install the outer series $a'$ of the balls, it will be found convenient to omit two adjacent balls and, after assembling the several parts, to cant the member $c'$ in order to expose the unoccupied spaces in the cage or ring $d$, whereupon the remaining balls may be gently forced into their respective places.

Having now fully described my said invention what I claim and desire to secure by Letters Patent is:—

1. In the herein described ball-bearing, the combination, with a radial ball-bearing comprising two concentric members whereof the outer one is internally grooved and the inner one formed as a portion of a sphere, of an axial ball-bearing comprising a ring formed with a spherical seat and a grooved face in conjunction with a correspondingly grooved flange formed integral with the inner member of the radial ball-bearing, all substantially as set forth.

2. In a combined radial and axial ball-bearing, a body formed as a portion of a sphere for constituting the inner member of the radial bearing, and, integral therewith, a radial flange having a grooved face for constituting the inner member of the axial ball-bearing, substantially as set forth.

In testimony whereof I have hereunto set my hand in the presence of two subscribing witnesses.

WALTER FOWLER.

Witnesses:
JOHN TAYLOR CARPENDALE,
H. H. GRAMMERS.